United States Patent [19]

Sherman et al.

[11] Patent Number: 4,627,335

[45] Date of Patent: Dec. 9, 1986

[54] APPARATUS FOR COOKING FOOD

[76] Inventors: Victor Sherman, 13-10 34 Ave., Long Island City, N.Y. 11106; Ilya Zborovsky, 3285 Wolfson Dr., Baldwin, N.Y. 11510; William Sanchez, 35-69 169 St., Flushing, N.Y. 11358

[21] Appl. No.: 801,781

[22] Filed: Nov. 26, 1985

[51] Int. Cl.⁴ .............................................. A47J 37/00
[52] U.S. Cl. ........................................ 99/325; 99/337; 99/349; 99/378; 99/373; 99/379; 219/524; 426/523
[58] Field of Search ................ 99/330, 331, 334, 335, 99/372, 373, 377, 378, 379, 422, 337, 325, 349; 426/523; 100/93 P; 219/524, 525

[56] References Cited

U.S. PATENT DOCUMENTS

| 2,031,259 | 2/1936 | Fox | 219/525 X |
| 2,136,764 | 11/1938 | Smith | 99/378 |
| 2,632,379 | 3/1953 | Kudo | 99/349 X |
| 3,620,156 | 11/1971 | Schindler | 99/349 |
| 3,682,655 | 8/1972 | Touba | 426/523 |
| 4,483,239 | 11/1984 | Mueller | 99/349 X |

FOREIGN PATENT DOCUMENTS 417055 9/1934 United Kingdom ................ 219/525

Primary Examiner—Billy J. Wilhite
Attorney, Agent, or Firm—Ilya Zborovsky

[57] ABSTRACT

An apparatus for cooking food includes two solid plates which subject an initial food material to high heat and pressure, and the pressure is adjusted in dependence upon the nature of the initial food material by an adjusting device.

10 Claims, 11 Drawing Figures

FIG. 6
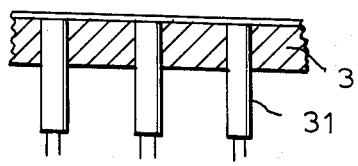
FIG. 10
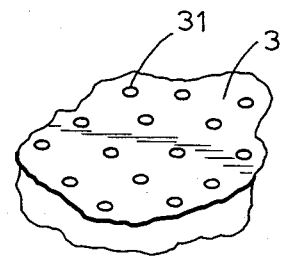
FIG. 7
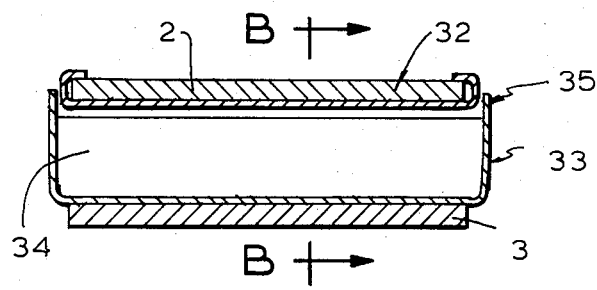
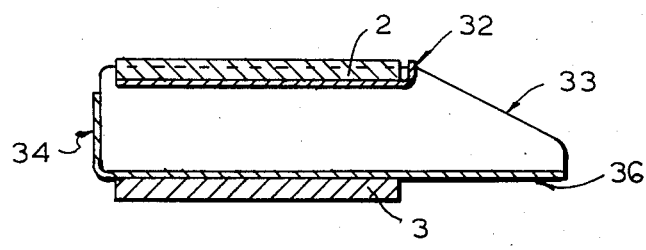
FIG. 11

APPARATUS FOR COOKING FOOD

BACKGROUND OF THE INVENTION

The present invention relates to an apparatus for cooling food. More particularly, it relates to an apparatus for cooking food in which an initial food material is subjected to the action of two hot plates which heat the initial food material at their temperature of at least 340° F. and also apply pressure at least 10 p.s.i.

An apparatus of this type is disclosed in the patent application Ser. No. 700,954. In this apparatus, since not only the high temperature but also the high pressure of at least 10 p.s.i. is applied to the initial food material, the temperature of evaporation of liquids or juices of the initial food material considerably increases under the action of high pressure. As a result of this, the liquid or juices from the initial food material do not evaporate as fast as in conventional apparatus and remain in the food, whereas cooking of inner portion is performed with the vapors of higher temperature generated inside of that food. The cooked food is much juicier and the cooking time is much shorter than in the conventional apparatuses.

SUMMARY OF THE INVENTION

Accordingly, it is an object of the present invention to provide an apparatus for cooking food of the above mentioned type, in which a pressure developed in the food material is adjustable.

In keeping with these objects and with others which will become apparent hereinafter, one feature of the present invention resides, briefly stated, in an apparatus having two plates, acting means for acting upon at least one plate and apply pressure of at least 10 p.s.i., heating means for heating the plates to at least 340° F., wherein means is provided for adjusting the pressure to be developed in the initial food material in dependence on the nature of the latter.

As explained hereinabove, the main purpose of applying the pressure to the initial food material (in addition to the temperature) is to increase the evaporation temperature of the juices in the initial food material. Various initial food materials (types of meat, paultry etc., quantity of the initial food material, degree of softness etc.) have different preferable temperature ranges of cooking and therefore different values of pressure are required. When the cooking apparatus is designed in accordance with the present invention, it allows adjustment of pressure in food material depending on the nature of the initial food material and thereby selection of the optimal cooking parameters in the apparatus for each particular initial food material.

The novel features of the present invention are set forth in particular in the appended claims. The invention itself, however, will be best understood from the following description of preferred embodiments, which is accompanied by the following drawings.

BRIEF DESCRIPTION OF THE DRAWINGS

FIG. 6 is a view showing the adjusting device in accordance with a further embodiment of the invention;

FIG. 7 is a view showing covers insertable between hot solid bodies of the inventive apparatus;

FIGS. 10 and 11 are views showing details of FIGS. 6 and 7 respectively.

DESCRIPTION OF PREFERRED EMBODIMENTS

Figure 1:
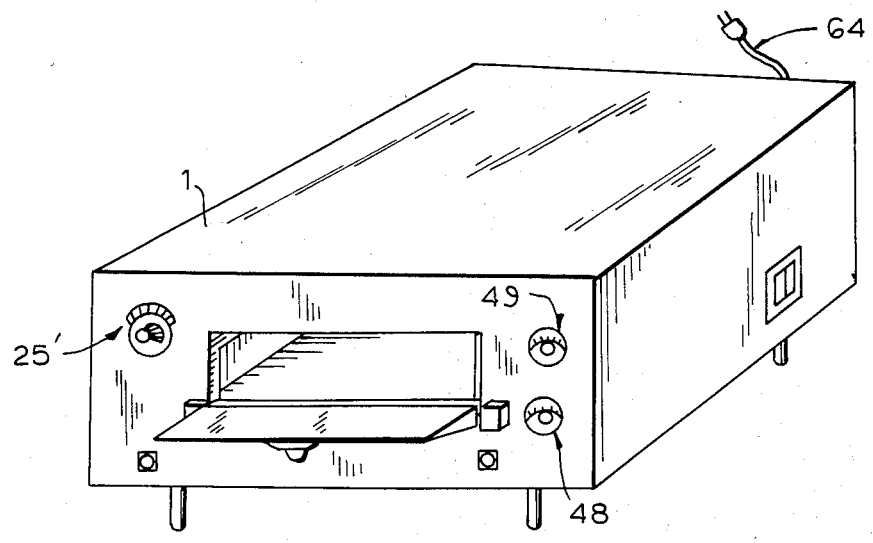
FIG. 1 is a perspective view of an apparatus for cooking food in accordance with the present invention.
Figure 2:
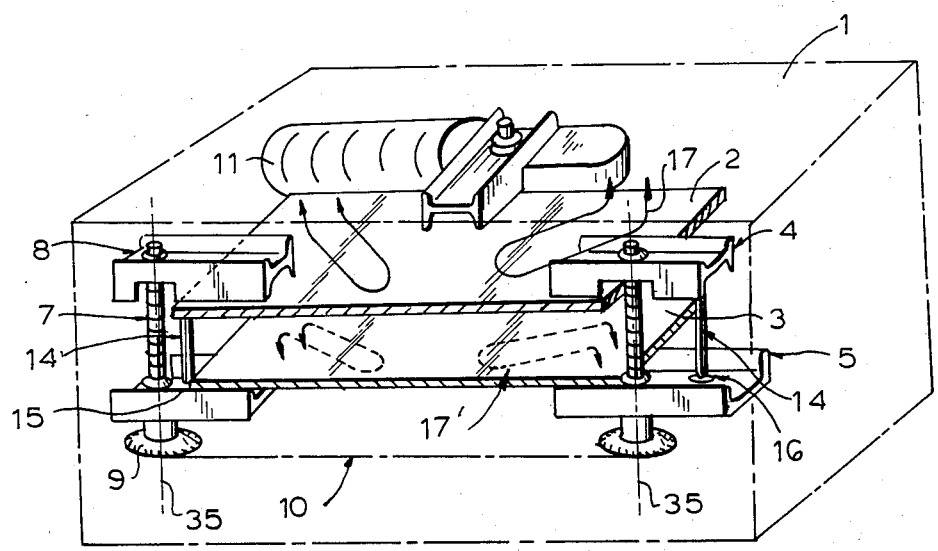
FIG. 2 is a schematic perspective view of inner elements of the inventive apparatus for cooking food.
Figure 3:
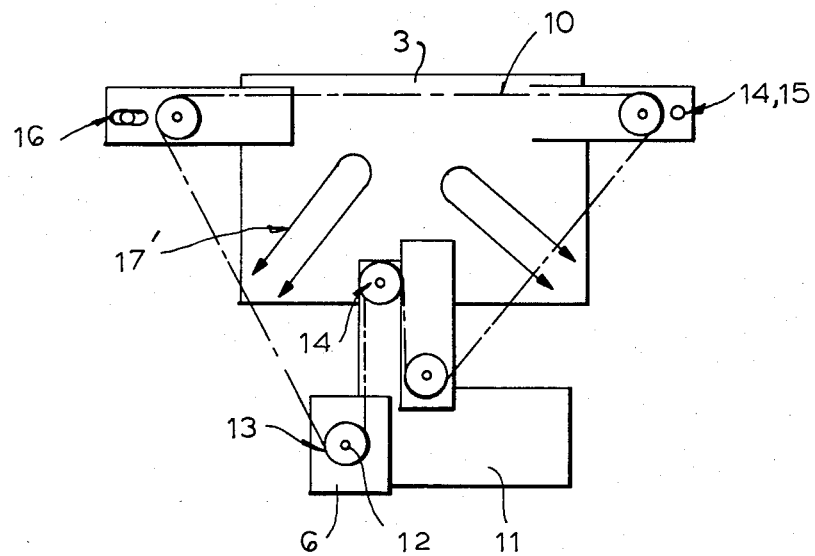
FIG. 3 is a bottomview of the inner elements shown in FIG. 2.

A cooking apparatus in accordance with one embodiment of the invention is shown in FIGS. 1-3. The cooking apparatus has a housing 1 which forms an interior of the apparatus for accommodating all inner parts and mechanisms. An upper plate of the apparatus is identified with reference numeral 2, while a lower plate is identified with reference numeral 3. At least one plate, for example the upper plate 2 is vertically movable relative to the other plate, here the lower plate, between a distal position and a plurality of proximal positions as will be explained hereinbelow.

The upper plate is provided with beams 4 and the lower plate is provided with channels 5. A plurality of screws 7 extend through openings in the beams and channels and cooperate with nuts 8 which are fixed in the beams 4. Sprockets 9 are arranged on screws 7, and a chain 10 passes around the sprockets 9 in engagement therewith. An electric motor 11 is provided on the output shaft 12 of its reducer 6 with a driving sprocket 13 which engages with the chain 10. An idler sprocket 14 is also provided to adjust the tension of the chain 10. When the electric motor is actuated by a not shown switch, it rotates the sprocket 13 on the shaft 12 and therefore moves the chain 10. The chain turns the screws 7 so that they are screwed into the nuts 8, whereby the upper plate 2 is forcedly pulled toward the lower plate 3 and an initial food material placed on the lower plate and brought in contact with the upper plate and somewhat compressed. When the rotation of the electric motor is reversed, the plate 2 is moved away of the plate 3. The screw 7 and the nuts 8 perform a double function. On the one hand, they serve as driving elements so as to move the upper plate 2 relative to the lower plate 3. On the other hand, they also serve as guiding elements which reliably guide the movement of the upper plate so that no additional guiding elements are needed.

Heating elements 17 are further provided for heating the plates. They are attached to the upper plate and the lower plate by known methods. The heating elements 17 are connectable to a source of electric current, for example a household or commercial electrical network, and are thereby heated so as to heat the plates 2 and 3.

As can be seen from the drawing the inventive apparatus has a single electrical conduit which is to be plugged into the electrical network so as to supply electric power to the electric motor 11 for moving the upper plate 2 and to the heating elements 17 so as to heat the plates. It is identified with reference numeral 64.

In accordance with the invention, pressure in the initial food material is adjusted in dependence on the nature of the initial food material, so as to increase correspondingly the evaporation temperature of the juices in it. The required values of pressure for respective initial food materials can be determined from experiments. For example with the temperature of 550° F. the required pressure in the initial food materials is approximately as follows: to make rare steak or beef—75–85 psi
medium steak or beef—70–90 psi
well-done steak or beef—70–80 psi
chicken breast—50–70 psi
chicken leg—65–80 psi
cornish hen—60–70 psi During cooking in the cooking apparatus in accordance with the present invention, the pressure is adjusted in accordance with the initial food material so as to obtain such a pressure which results in a proper temperature of evaporation of the juices and thereby in high juice contents of the final product and in very short time of cooking, namely within 30–90 sec. for the above listed food materials. When the pressure in the initial food material is selected in accordance with the above listed values the rare steak can be made in 30 sec., medium steak in 45–60 sec., well-done steak in 70–100 sec., chicken breast in 55–90 sec., chicken leg in 60–100 sec, cornish hen in 80–90 sec., etc.

Figure 4:
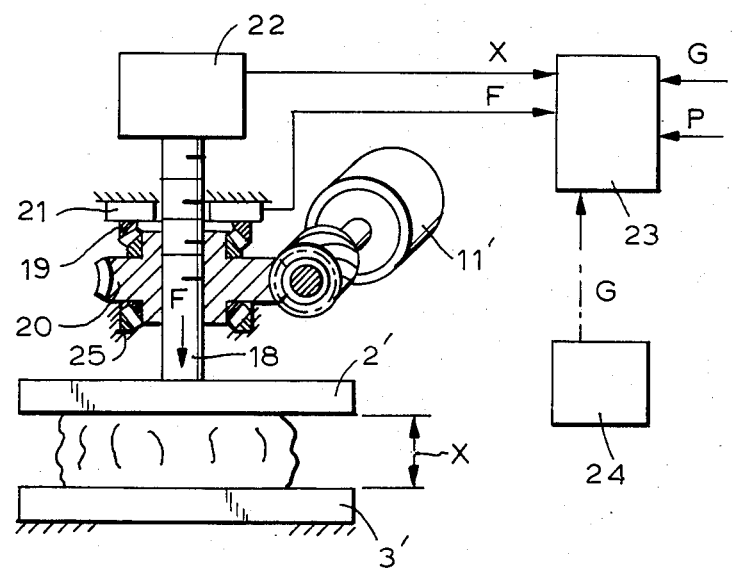
FIG. 4 is a view showing a device for adjusting the pressure in the inventive apparatus, in accordance with one embodiment of the invention.

In accordance with the invention, means is provided for adjusting movement of the upper plate so as to obtain the required pressure in correspondence with the initial food material. One of such adjusting means is shown in FIG. 4. This adjusting means is associated with an apparatus which has only one central bolt 18 which is screwable in one immovable nut 20 arranged in two supports 19. The embodiments of FIGS. 2 and 3 can also be provided with such adjusting means The upper plate 2' is movable by the bolt 18 relative to the lower plate 3' as will be explained hereinbelow in detail with respect to an apparatus shown in FIG. 9 with a drive in accordance with the embodiment which is different from the embodiment of FIGS. 2 and 3. The upper support 19 is provided with a force sensor which senses a force F applied by the bolt 18 during movement of the upper plate 2', to the initial food material. This force is also applied to the upper support 19 and therefore can be sensed by the force sensor 21 arranged on this support. The force sensor can be formed as a wire gauge, semiconductive sensor, etc. A linear displacement sensor 22 is arranged on a stationary part of the apparatus and senses a linear displacement of bolt 18 which is adequate to the displacement of the upper plate 2'.

The adjusting means is further provided with a microprocessor 23 which is connected with the sensors 21 and 22. On the other hand, the microprocessor 23 has inputs for introducing data corresponding to the weight of the initial food material to be cooked (G) and the required pressure (P) selected for instance in accordance with the above listed values or based on the experience of a cook. As shown in the drawing, instead of manual weighing of the initial food material, a weight determining element (scale etc.) 24 can be connected with the microprocessor shown in phantom line. Finally, the microprocessor 23 is connected with an electric motor 11'.

The apparatus with the adjusting means in accordance with the embodiment of FIG. 4 can operate in the three following modes. While operating in the first mode, the required pressure P and the weight of the initial food material G are introduced first into the microprocessor. The electric motor 11' is turned on and the upper plate 2' is moved downwardly toward the lower plate 3' and brings the initial food material which has been placed on the lower plate, into contact with the upper plate. During subsequent downward movement of the upper plate and compression of the initial food material, the force sensor 21 supplies into the microprocessor continuously the values of F, while the linear displacement sensor 22 supplies into the same the value of linear displacement or more particularly the changing distance x between the plates. When the product of F and x becomes equal to the product of G and P divided by density of the meat product (which is approximately the same for all row meats and therefore can be introduced into the microprocessor while programming), the microprocessor turns the electric motor off, since the required pressure has been achieved. The upper plate 2' stops, and the cooking is performed in condition of this pressure. At the end of the cooking time the electric motor is reversed as will be explained, and the upper plate is withdrawn up to its initial position.

For operating in the second mode, it shall be first determined from the experiments what percentage of compression must be provided in the initial food material (i.e. % of final thickness to the initial thickness of the food material). A user introduces into the microprocessor the required compression in correspondence with the pressure in the initial food material required for the particular food material. The electric motor 11' is turned on and the upper plate is moved downwardly. The force sensor 21 senses the moment when the initial food material is brought into contact with the upper plate (since the force increases) and at this moment the linear displacement sensor senses the initial thickness of the initial food material and then continues sensing the diminishing thickness. During this process the microprocessor continuously compares the initial thickness of the food material with the current thickness of the food material at every moment of the movement of the lower plate and when the compression introduced ito the microprocessor is reached, turns off the electric motor. The process of cooking starts, and after a certain preset time the upper plate is moved back.

Finally, the adjusting means can be formed and operate in a further mode, different from two firstmentioned modes. From experiments, a user determines what final thickness of the food material corresponds to the pressure in the food material required for the particular food material. For a particular food material, the user introduces into the microprocessor 23 the required value of the final thickness of the food material. During movement of the upper plate 2' toward the lower plate 3' and compression of the food material, the linear displacement sensor continuously supplies the values of the distance between the plates x, and when the value of the final thickness or the distance between the plates x is reached, the microprocessor turns off the electric motor and the lower plate is stopped for cooking during the respective cooking time.

The above described adjusting means can operate in a cooking apparatus having a movable lower plate in a cooking apparatus with a movbale upper plate.

Figure 5:
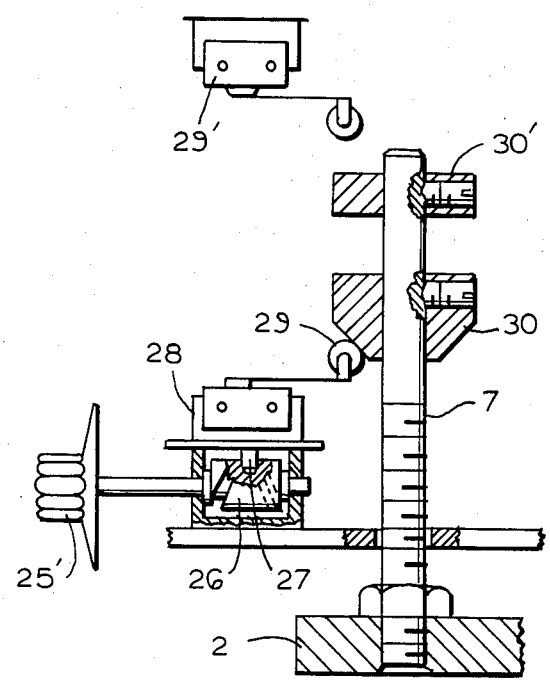
FIG. 5 is a view showing the adjusting device in accordance with another embodiment of the invention.
Figure 9:
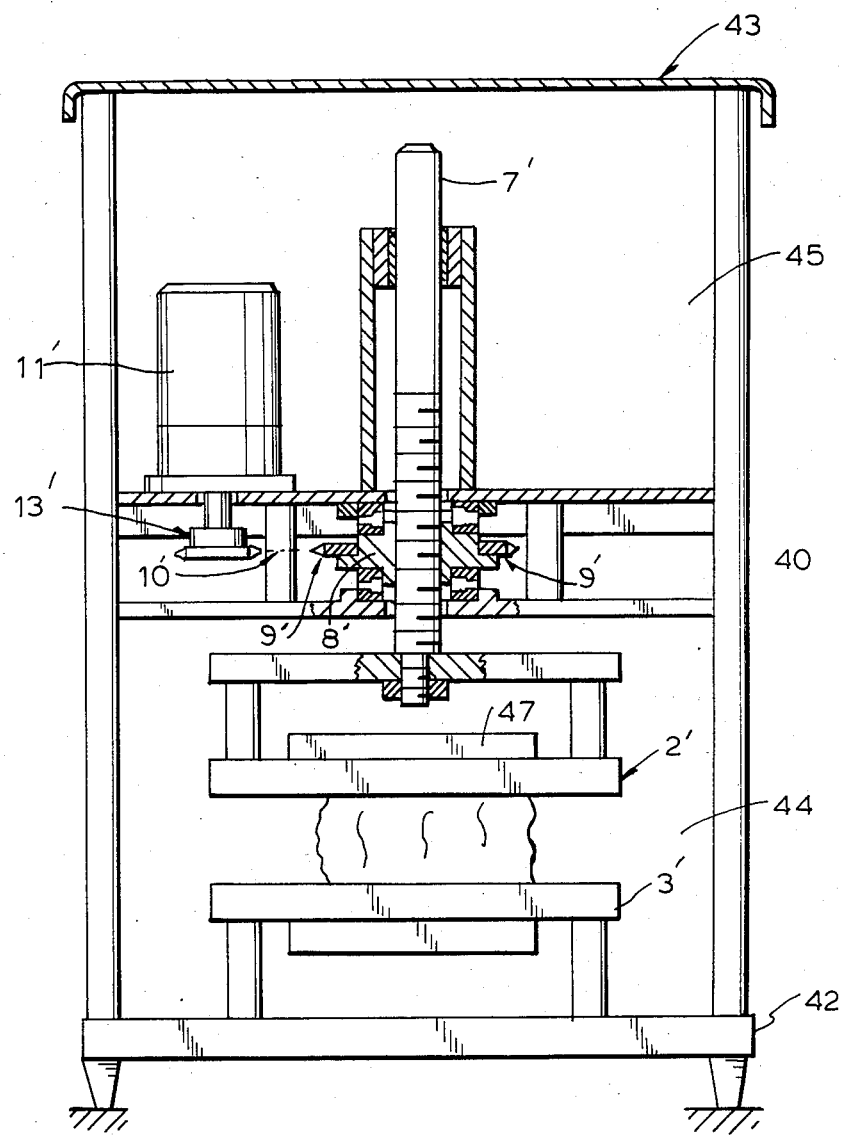
FIG. 9 is a view showing an inventive cooking apparatus in accordance with a different drive.

The adjusting means shown in FIG. 5 cooperate with the movable upper plate 2 of the cooking apparatus shown in FIGS. 2 and 3, but of course can be used for the apparatus of FIG. 9. This adjusting means includes a turnable knob 25 with a screw 26 having a shaped groove. A pin 27 is guided in the groove of the screw 26 and is fixedly connected with a body 28 which carries a sensitive element 29 of a switch connected with the electric motor 11. A body 30 with a conical surface is fixedly connected with the bolt 7 of the upper plate 2. When from experiments a user knows a required final thickness (distance between the plates) of the food material to provide the respective pressure in the food material, he turns the knob 25' associated with graduation marks showing the final thickness and stops the knob at the respective graduation mark. The turning of the knob results in turning of the screw 26, and therefore axial displacement of the pin 27, the body 28, and the sensing element 29. Depending on the axial distance of the sensing element 29 from the axis of the screw 7 and the body 30, the body 30 reaches the sensing element 29 earlier or later so as to turn off the electric motor at the required moment and to stop the upper plate at the required distance from the lower plate. Thereby the respective pressure of food material is reached and the cooking is performed at this pressure. Uppermost position of the plate 2' is determined by a body 30' and switch 29'.

FIGS. 6 and 10 show the adjusting means in accordance with still a further embodiment. A pressure sensor or sensors 31 are arranged in at least one plate 2 or 3 and connected with controls of the electric motor 11 directly or via an averaging unit. During compression of the food material between the plates, the sensors 31 sense the pressure in the initial food material and supply the values, for example, to a microprocessor which turns off the electric motor when the required pressure corresponding to the particular food material is reached.

FIGS. 7 and 11 show that the plates 2 and 3 are provided with covers 32 and 33 which together form a box for direct cooking and cover the plates to prevent the need for frequent cleaning. The covers 32 and 33 are easily removvble for cleaning purposes. The lower cover 33 is provided with a tray-like extension 34 which extends forwardly beyond the front edge of the lower plate 3. Before inserting the initial food material into the box, it can be first deposited on the extension 36, for example for observation etc. After the food material has been cooked, it is first slid onto the extension 36 and then can easily be removed from the latter for serving, or cut to pieces on the extension, etc. This significantly facilitates manipulations with the food material during operation of the machine. The lower cover has a rear wall 34 which is somewhat lower than side walls 35 so as to provide its easy passage when inserting to the place while using the side walls as guides during operation.

Figure 8:
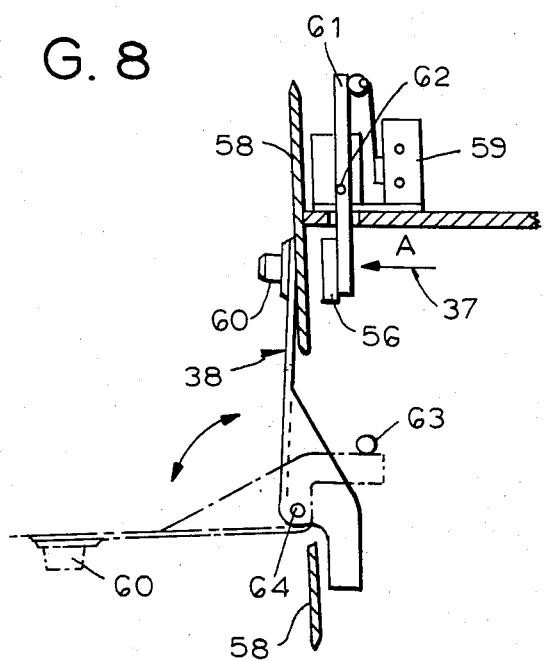
FIG. 8 is a view showing another embodiment of the inventive cooking apparatus with a door locking safety device.

FIG. 8 is a view showing a door 38 of the inventive apparatus, provided with a device for locking which simultaneously performs safety function. The device includes a movable magnet 56 which is supported movable in direction of the arrow 37 on a stationary part of the apparatus, for example inwardly beyond its front wall 58. The magnet 56 is arranged in a circuit of the electric motor 11 so as to close or open the circuit and therefore to turn on or off the electric motor. When a user turns the door 38 composed of magnetically attractable material, for example steel or provided with a handle 69 made of such a material, and the edge of the door approaches the magnet 56, the latter attracts the door and firmly hold it in the closed condition. Simultaneously, the magnet moves in the direction of the arrow 37 so as to close the circuit of the electric motor 11, for example by affecting a switch 59 and to allow starting of the latter. This means that only when the door is closed and a user's hand, clothes etc cannot be caught into the cooking space, the motor can be started and the upper plate 2 can move downwardly toward the lower plate. Thus, the magnet 56 is a part of the lock which locks the door, on the one hand, and a part of a safety device which prevents starting of the motor unless the door is closed, on the other hand. This simplifies the construction of the apparatus because of the double function of the magnet.

FIG. 9 shows the cooking apparatus in accordance with the invention, in which only one central bolt 7' is provided, as mentioned hereinabove. The electric gear motor 11' drives, through a reducer, a driving sprocket 13', a chain 10', and a sprocket 9' mounted on a nut 8'. The rotation of the nut 8' results in vertical movement of the screw 7' and thereby the upper plate 2'. The interior of the cooking apparatus is subdivided by a partitions 40, as well as a bottom 42 and a cover 43, into two compartments 44 and 45. The compartment 44 forms a cooking compartment of the apparatus and accommodates substantially the cooking parts, namely the plates 2' and 3' with the heating elements in the heating box 47. The compartment 45 forms an electrical and electronic compartment and accommodates substantially the electric motor 11', transmission parts, a timer 48 which determines the time of cooking which is adjustable and sets the required time of cooking from the moment of the final compression of the food material to the moment of withdrawal start of the movable plate, a temperature control unit 49 which adjusts the temperature of the heating elements and therefore the temperature of the plates, controls of the electric motor for turning on and off of the same, the microprocessor with respective sensors such as the linear displacement sensor, force sensor etc.

As mentioned hereinabove, the cooking apparatus is provided with means for adjusting the cooking time, the temperature of the plates, as well as other control means. The construction shown in FIG. 2 is very space economical and inexpensive to manufacture.

In accordance with a further very important feature of the present invention the apparatus is formed so that more heat is emanated by the lower hot parts under the lower surface of the food material.

It has been found that some amount of juices(liquid) is squeezed from the food material and accumulates under the lower surface of the food material. They form a liquid layer which possesses heat insulating properties and therefore the lower surface (and the adjoining part) of the food material is ultimately less cooked than the upper surface since it receives less heat. To eliminate this disadvantage it is proposed in accordance with the present invention to form the cooking apparatus so that the lower surface of the food material receives despite the presence of juices, the same amount of heat. The lower parts of the apparatus, which are located under the lower surface of the food material emanate more heat so that ultimately the same amount of heat is received by the lower surface and the upper surface of the food material.

In accordance with one approach to this problem, the heaters which are associated with the lower plate 3 in FIG. 2 generate more heat than the heaters associated with the upper plate 2 or in other words are heated to a higher temperature. For this purpose the heaters 17 associated with the lower plate 3 can have a higher resistance (a greater wire diameter or a shorter length) than the heaters 17 associated with the upper plate 2. In this case the lower plate is heated to a higher temperature than the upper plate. However, since between the lower plate and the lower surface of the food material there is a layer of juices with poor heat conductivity, the same amount of heat reaches the lower and upper surfaces of the food material.

In accordance with another approach, the lower cover 33 in FIG. 7 is made thinner than the upper cover 32 and therefore is more heat conductive than the upper cover 32. While both plates 2 and 3 transfer the same amount of heat to both covers 32 and 33, the lower cover 33 transmits more heat than the upper cover 32, and after reducing of the heat amount by the layer of juices, the same amount of heat reaches the lower and upper surfaces of the food material.

In such constructions both surfaces of the food material are cooked actually identically.

The invention is not limited to the details shown since various modifications and structural changes are possible without departing in any way from the spirit of the present invention.

What is desired to be protected by Letters Patent is set forth in particular in the appended claims.

We claim:

1. An apparatus for cooking food, comprising at least two solid plates, at least one of said plates being movable relative to the other plate so that an initial food material can be directly contacted by said plates from both sides; means for heating said plates to a high temperature; means for acting on at least said one plate and including driving means for driving said one plate into movement toward said other plate so as to develop in the initial food material a high pressure, so that cooking is performed not only under the action of the high temperature, but also under simultaneous action of the high pressure which increases the temperature of evaporation of liquid matter from the initial food material; and means for adjusting the pressure in the initial food material in dependence on the nature of the initial food material, said adjusting means including a sensing element which senses at least one parameter of the movement of said one plate and when said parameter reaches a value corresponding to said pressure in the initial food material said sensing element switches off said driving means so as to stop said one plate.

2. An apparatus as defined in claim 1, wherein said sensing element is formed as an end switch actuatable by said one plate and operative for turning off said driving means; and further comprising means for changing a position of said end switch relative to said other plate.

3. An apparatus as defined in claim 1, wherein said sensing element is formed so that it senses a force applied to said one plate and a final distance between said plates, said adjusting means further including a microprocessor arranged to receive data about weight of the initial food material and said pressure and to compare a product of the weight and the pressure with the product of the force and the distance so as to turn off said driving means when said products become equal.

4. An apparatus as defined in claim 3, wherein said adjusting means includes means for weighing the initial food material and introducing the weight into said microprocessor.

5. An apparatus as defined in claim 1, wherein said sensing element is arranged in at least one of said plates and senses a pressure which is being developed in the initial food material and when it reaches said pressure of at least 10 p.s.i. turns off said driving means 6. An apparatus as defined in claim 5, wherein said sensing element includes a plurality of sensing members arranged in at least one of said plates and connected with one another so as to sense an average pressure developed in the initial food material over its dimension extending in a direction of said at least one plate.

7. An apparatus for cooking food, comprising at least two solid plates, at least one of said plates being movable relative to the other plate so that an initial food material can be directly contacted by said plates from both sides; means for heating said plates to a high temperature, said heating means including an electric heating element which heats each of said plates; means for acting on at least said one plate and including an electric drive element which moves said one plate toward said other plate so as to develop in the initial food material a high pressure, so that cooking is performed not only under the action of the high temperature, but also under simultaneous action of the high pressure which increases the temperature of evaporation of liquid matter from the initial food material; means for adjusting the pressure in the initial food material in dependence on the nature of initial food material; and means for supplying electric power and including a common electric conduit which connects said electric drive element and said electric heating element simultaneously with a source of electric power.

8. An apparatus for cooking food, comprising at least two solid plates, at least one of said plates being movable relative to the other plate so that an initial food material can be directly contacted by said plates from both sides, said plates having front edges at a side through which the initial food material is inserted between said plates; means for heating said plates to a high temperature; means for acting on at least said one plate so as to develop in the initial food material a high pressure, so that cooking is performed not only under the action of the high temperature, but also under simultaneous action of the high pressure which increases the temperature of evaporation of liquid matter from the initial food material; means for adjusting the pressure in the initial food material in dependence on the nature of the initial food material; and a box-shaped insert insertable into a space between said plates and formed so that it is in contact with said plates and also is brought into contact with the initial food material when said one plate has been moved toward said other plate, said box-shaped insert having a projection extending forwardly beyond said edges and forming a tray for handling the initial food material or cooked food.

9. An apparatus as defined in claim 8, wherein said insert has an upper cover and a lower cover, at least said lower cover having a rear wall and side walls, said rear wall being somewhat lower than said side walls of said lower cover.

10. (replacing the allowable claim 15) An apparatus for cooking food, comprising at least two solid plates, at least one of said plates being movable relative to the other plate so that an initial food material can be directly contacted by said plates from both sides; means for heating said plates to a high temperature; means for acting on at least said one plate so as to develop in the initial food material a high pressure, so that cooking is performed not only under the action of the high temperature, but also under simultaneous action of the high pressure which increses the temperature of evaporation of liquid matter from the initial food material; means for adjusting the pressure in the initial food material in dependence on the nature of initial food material; and a box-shaped insert inserted between said plates and having an upper cover member and a lower cover member, said lower cover member being thinner than said upper cover member so as to transfer more heat from said lower plate than said upper cover transfers from said upper plate.

* * * * *